United States Patent Office 3,016,374
Patented Jan. 9, 1962

3,016,374
PRODUCTION OF LACTAMS BY THE BECKMANN REARRANGEMENT USING UREA BISULFATE AS CATALYST
Thomas R. Hopkins, Johnson County, Myron David Osborn, Overland Park, and William C. Francis, Mission, Kans., assignors to Spencer Chemical Company, Kansas City, Mo., a corporation of Missouri
No Drawing. Filed Oct. 3, 1958, Ser. No. 765,067
7 Claims. (Cl. 260—239.3)

This invention relates to the production of lactams by the rearrangement of alicyclic oximes. More particularly, this invention is concerned with an improved process for effecting such rearrangements.

In the well known Beckmann rearrangement, alicyclic oximes are treated with a strong acid catalyst such as sulfuric acid to rearrange the oximes and obtain the corresponding lactam. At the present time this process is used commercially to rearrange cyclohexanone oxime to obtain epsilon-caprolactam which is the monomer of Nylon 6. It is also particularly suitable for rearranging other alicyclic oximes such as cyclopentanone oxime to obtain gammavalerolactam.

Following completion of the rearrangement, the reaction mixture is neutralized and the lactam separated from the mixture by solvent extraction. The most common neutralizing agent employed is aqueous ammonium hydroxide so that when sulfuric acid is used as the rearrangement catalyst, the neutralization leads to ammonium sulfate which cannot be reused in the process. The ammonium sulfate therefore must be sold as for fertilizer use; however, this material is now in over-supply on the market and thus brings only low prices. Besides leading to a low priced by-product, this neutralization process also involves large volumes of water which are required since the neutralization is exothermic and the heat released must be dissipated to control the process. The large amount of neutralization medium involved keeps high the cost of separating the lactam and recovering the by-product, ammonium sulfate.

According to the present invention there is provided an improved process of rearranging alicyclic oximes to obtain the corresponding lactams therefrom. This process comprises intimately contacting an alicyclic oxime with urea bisulfate

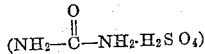

at a suitable rearrangement temperature. This process has a number of advantages over the described prior art process such as permitting recyclization of the urea bisulfate catalyst for use in the rearrangement of additional amounts of alicyclic oxime, the elimination of a neutralization step, and the choice, if desired, of separating lactam from the rearrangement mixture without prior dilution with water.

Although it was found that urea sulfate, formed by the reaction of two moles of urea with one mole of sulfuric acid, will not catalyze the rearrangement, urea bisulfate is, surprisingly, a very effective rearrangement catalyst.

Urea bisulfate is also a particularly suitable catalyst for effecting the rearrangement because it has a melting point of about 60° C., which is substantially below the temperatures of about 90–125° C. ordinarily employed in the rearrangement, so that the reaction can be effected under liquid reaction conditions without necessary use of additives or solvents of any kind.

The reaction time is not critical but does somewhat influence the yield of lactam obtained. A substantial amount of the oxime rearranges immediately upon contact with the catalyst at rearrangement temperatures. The reaction is readily controlled by adjusting the rate of addition of the oxime to the catalyst. When all the oxime has been added, the mixture may be cooled at once and the lactam separated, or the mixture may be heated for a short time and then allowed to cool. In general, a reaction time of up to about two hours is sufficient to substantially rearrange the amount of alicyclic oxime present although it should be understood that one skilled in the art may vary the time and reaction temperature as warranted to obtain the highest yields.

The amount of urea bisulfate employed in the reaction in relationship to the alicyclic oxime is not critical although, in general, from about one to four or more moles of urea bisulfate are advisably used for each mole of alicyclic oxime to be rearranged.

Following rearrangement of the alicyclic oxime, the resulting lactam may be separated by several methods. In one method, the reaction mixture may be extracted directly with a suitable solvent for the lactam, such as chloroform, n-hexane, benzene or dioxane, and the solvent extract subsequently distilled to isolate the lactam. To facilitate the extraction, it is preferably effected under reflux conditions at a temperature high enough to maintain an easily workable mixture providing efficient contact with the solvent. A second method for effecting the lactam separation is to dilute the reaction mixture with water and then extract the aqueous reaction mixture with a suitable solvent such as chloroform, dioxane, benzene or n-hexane. Following removal of the lactam the aqueous urea bisulfate solution may be distilled to dryness and the dry recovered urea bisulfate used to rearrange additional quantities of oxime.

The following examples are presented to illustrate, but not restrict, the invention.

Example 1

Urea (60 g., 1 mole) was added to 102 g. (1 mole) of concentrated sulfuric acid while stirring and heating at about 90–100° C. The mixture crystallized on cooling and was dried to yield 162 g. (100%) of urea bisulfate, M.P. 59–61° C.

Example 2

Urea bisulfate (162 g., 1 mole) was heated and stirred at 95° C. while 28.2 g. (0.25 mole) of cyclohexanone oxime was added. The total reaction time was about 25 minutes. The warm (50° C.) mixture was then added to 139 g. of chipped ice to give a 54% bisulfate solution, and the solution was then extracted with chloroform. Removal of the chloroform by distillation gave a 44% yield of crude epsilon-caprolactam.

Example 3

The reaction of Example 2 was repeated at the higher temperature of about 105–110° C. for 2 hours with 18 g. (0.16 mole) of oxime. The product mixture was added to enough chipped ice to give a 30% bisulfate solution, which was extracted with chloroform. Removal of the chloroform by distillation gave 16.2 g. of crude epsilon-caprolactam. Recrystallization from ligroin yielded 8.3 g. of epsilon-caprolactam, M.P. 68–72° C. plus smaller crops of crude product. The aqueous urea bisulfate solution was distilled to dryness under reduced pressure and the residue then dried to a constant weight of 150 g., corresponding to a 93% recovery of crude urea bisulfate. This material was used to catalyze a second rearrangement of 18 g. of the oxime at the shorter reaction time of 1 hour. Isolation of the lactam by extraction with chloroform as before yielded 15.6 g. of crude product, which on recrystallization from ligroin gave 13.1 g. of epsilon-caprolactam, M.P. 63–67° C., corresponding to a 73% conversion. The aqueous urea bisulfate solution was distilled to dryness under reduced pressure as before and dried to constant weight to give 144 g. (96% recovery) of crude urea bisulfate. A third rearrangement using the recovered catalyst was carried out in a reaction time of 0.5 hour. Isolation of the product as before gave 14.3 g. of crude product, which upon recrystallization from ligroin yielded 9.5 g. of epsilon-caprolactam, M.P. 63–68° C., corresponding to a conversion of 53%.

*Example 4*

Urea bisulfate was prepared by adding 30 g. (0.5 mole) of urea to 51 g. (0.5 mole) of concentrated sulfuric acid while stirring and heating at 90° C. The catalyst was heated to about 105° C. and 28.2 g. (0.25 mole) of cyclohexanone oxime was added slowly while maintaining a reaction temperature of about 105–115° C. Heating was continued for about 20 minutes after the addition was complete. The reaction mixture was extracted with successive portions of refluxing chloroform. Removal of the chloroform from the combined extracts gave a 40% yield of crude product, which upon recrystallization from ligroin gave an 11% yield of crude epsilon-caprolactam, M.P. 56–65° C.

Various changes and modifications of the invention can be made and, to the extent that such variations incorporate the spirit of this invention, they are intended to be included within the scope of the appended claims.

What is claimed is:

1. In the process for production of a lactam by the Beckmann rearrangement of an alicyclic oxime the improvement which consists in the use of urea bisulfate as the rearrangement catalyst.

2. In the process for production of a lactam by the Beckmann rearrangement of an alicyclic oxime at 90 to 125° C. the improvement which consists in the use of urea bisulfate as the rearrangement catalyst.

3. In the process for production of epsilon-caprolactam by the Beckmann rearrangement of cyclohexanone oxime, the improvement which consists in the use of urea bisulfate as the rearrangement catalyst.

4. In the process for production of epsilon-caprolactam by the Beckmann rearrangement of cyclohexanone oxime at 90 to 125° C., the improvement which consists in the use of urea bisulfate as the rearrangement catalyst.

5. In the process for production of a lactam by the Beckmann rearrangement of an alicyclic oxime at 90 to 125° C. the improvements which consist in the use of urea bisulfate as the rearrangement catalyst, extraction of the lactam from the rearrangement mixture, recovery of the urea bisulfate from the residue and recyclization of the recovered urea bisulfate into intimate contact with additional alicyclic oxime and rearrangement of the same.

6. In the process for production of epsilon-caprolactam by the Beckmann rearrangement of cyclohexanone oxime at 90 to 125° C. the improvements which consist in the use of urea bisulfate as the rearrangement catalyst, extraction of the resulting epsilon-caprolactam from the rearrangement mixture, recovery of the urea bisulfate from the residue and recyclization of the recovered urea bisulfate into intimate contact with additional cyclohexanone oxime and rearrangement of the same.

7. In the process for production of lactam by the Beckmann rearrangement of an alicyclic oxime at 90 to 125° C. the improvements which consist in the use of urea bisulfate as the rearrangement catalyst, separation of the lactam from the rearrangement mixture and recyclization of the catalyst residue into intimate contact with additional alicyclic oxime and rearrangement of the same.

References Cited in the file of this patent

UNITED STATES PATENTS 2,723,266 Lincoln et al. _____ Nov. 8, 1955
2,952,675 Bolle _____ Sept. 13, 1960

OTHER REFERENCES

Fieser: Organic Chemistry, 3rd ed. (1956), page 168, page 181, pages 874–6.